John J. Hagan,
Kenneth P. Keating,
Thomas H. Austin,
INVENTORS.

BY
TERRENCE D. DREYER,
ATTORNEY.

United States Patent Office 3,751,518
Patented Aug. 7, 1973

3,751,518
INTEGRATED CONTINUOUS PROCESS FOR
OLEFIN PRODUCTION
John Joseph Hagan, Kenneth Patrick Keating, and
Thomas Howard Austin, Austin, Tex., assignors to
Jefferson Chemical Company, Inc., Houston, Tex.
Filed Aug. 16, 1971, Ser. No. 172,159
Int. Cl. C07c 3/10
U.S. Cl. 260—683.15 D
4 Claims

ABSTRACT OF THE DISCLOSURE

A novel combination of olefin polymerization reactions provides an integrated continuous process for efficiently producing high yields of certain olefins that are valuable for preparing olefin sulfonates.

---

Figure 1:
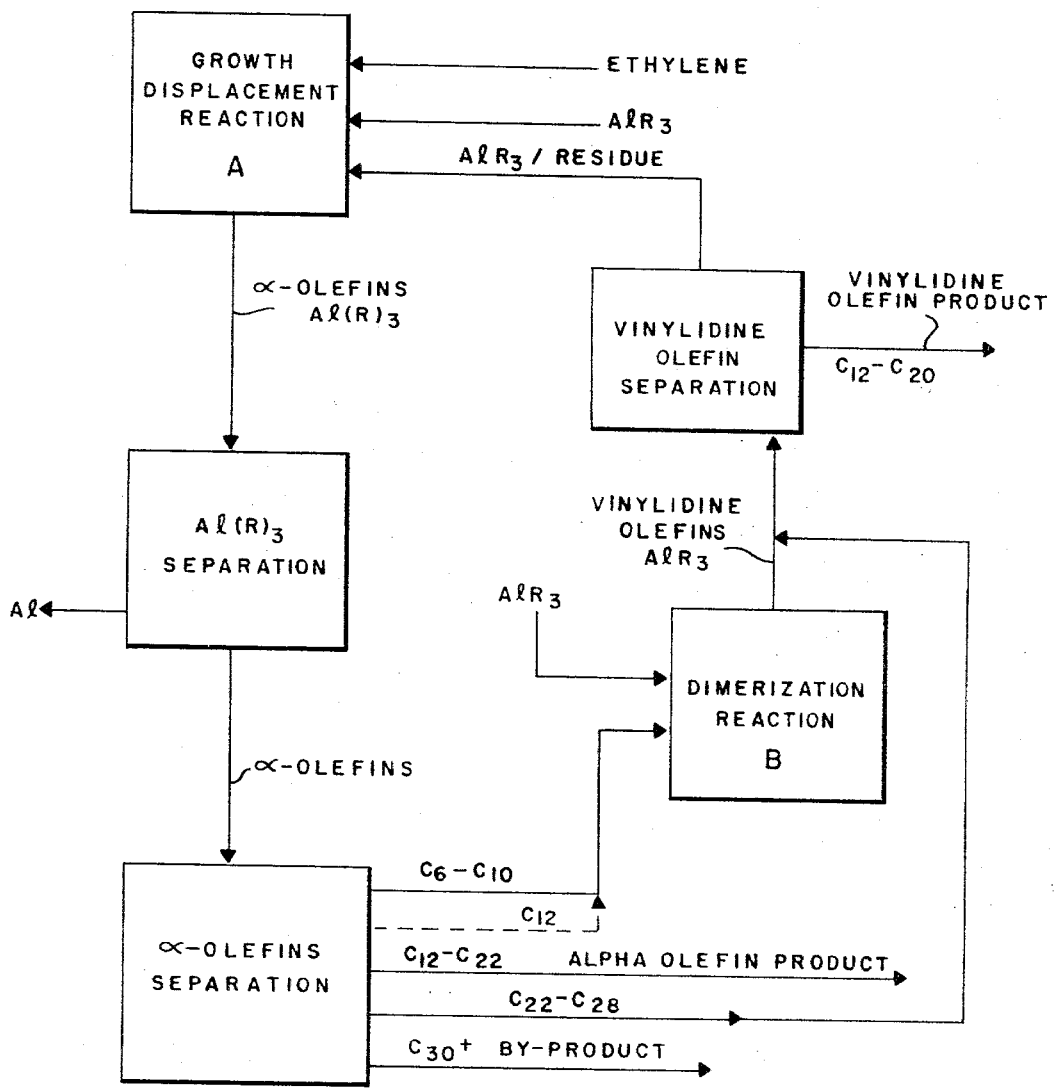

This invention broadly relates to a continuous process for manufacturing olefins. More particularly, this invention relates to an integrated continuous process for efficiently producing high yields of olefins that are particularly valuble for preparing olefin sulfonates, synthetic detergents, and surfactants.

The conversion of ethylene to normal alpha olefins in the presence of organometallic compounds, such as the trialkylaluminum species, is well known. Exemplary methods are described in U.S. Pat. Nos. 3,482,000 and 3,310,600. Typical prior art methods include the production of olefins by the catalytic polymerization of ethylene or by a process wherein essentially stoichiometric quantities of trialkylaluminum compounds are employed. In the latter process, after relatively large alkyl groups are formed on the trialkylaluminum compound, a displacement reaction is performed in order to displace and recover the corresponding olefins.

Similarly recognized is the process for dimerizing alpha-olefins in the presence of organometallic compounds, such as trialkylaluminum. The disclosures of U.S. Pat. Nos. 2,695,327 and 3,492,364 describe typical dimerization procedures.

Despite the foregoing knowledge, the above-mentioned processes, i.e., the n-alpha-olefin processes and the dimerization process, were essentially considered to be distinct in that each process was viewed as independently serving a particular purpose. In essence, an integrated combination of the two processes to provide an overall continuous method for producing certain olefins has not heretofore been described.

These said certain olefins which are of considerable interest to our invention comprise predominantly alpha-olefins having about 12 to 22 carbon atoms per molecule and vinylidene olefins having about 12 to 20 carbon atoms per molecule. These particular olefins are presently considered to be extremely valuable. They can be used, as aforestated, in preparing synthetic detergents and surface active compositions, such as by sulfonation thereof.

The desirability of producing vinylidene olefins in large quantities, such as those in the $C_{12}$ to $C_{20}$ range as herein characterized, is in itself somewhat of a unique aspiration. Vinylidene olefins, util recently, have generally been considered as an undesirable class of olefins. In general high molecular olefins, such as the $C_{20}$'s and higher, were likewise not particularly desired. It is significant that our invention is in part directed towards producing said certain olefins and towards advantageously using high molecular olefin fractions that were heretofore considered to be comparatively of little or no value.

With the recent emphasis on environmental conservation and ecology awareness, the importance of being able to economically produce, in large quantities, these certain biodegradable olefins has naturally escalated since the vinylidene and alpha-olefins sulfonates have excellent detersive characteristics and represent an alternative to the use of some of the so-called detergent pollutors.

Unfortunately, prior art methods have not provided a continuous nor efficient method for producing such olefin materials and are in fact economically discouraging.

Although polymerization methods have heretofore been developed that sought to peak the production of said certain alpha-olefins and thus provide a product having a particular average carbon chain size, such methods have generally been developed at the expense of process simplicity and economy, notwithstanding that large amounts of economically and functionally unattractive alpha-olefins were still produced. Another discouraging fact is that processes for producing vinylidene olefins, such as those suitable for detergent manufacture, as herein mentioned, have generally not advanced as rapidly as has the development of alpha-olefin processes.

Summarily, an efficient process for producing large quantities of these certain alpha and vinylidene olefins remained, until our discovery, an unrealized but desirable aspiration.

Now, because of our integrated process as herein disclosed, there is available a method whereby said desirable olefins can be continuously produced in large quantities. Surprisingly, these achievements are made possible by using our process without resort to those methods which sacrifice process simplicity and economy. Accordingly, our process advantageously includes the employment of a single step, combined growth-displacement polymerization reaction and also includes the use of olefin fractions heretofore considered as undesirables.

Heretofore, producers of alpha-olefins, such as those desiring to prepare sulfonated alpha-olefins, would naturally be discouraged from employing the single step, combined growth-displacement polymerization reaction, even though it offered advantages of simplicity and economy, because it was necessary to accept the comparatively broad distribution of the products, i.e., carbon chains of about $C_4$ to $C_{40}$, thus produced. Although the carbon distribution of the olefins made in the combined growth-displacement reaction can be altered somewhat by controlling the polymerization reaction conditions, it is generally recognized that the single step, combined growth-displacement polymerization reaction will provide only about 30% to 40% by weight alpha-olefin in the desirable $C_{12}$ to $C_{20}$ range. In essence, the relatively large amounts of alpha-olefins outside this molecular weight range simply made the process unattractive.

Because of our invention, these alpha-olefin manufacturers can employ the relatively simple, single step, combined growth-displacement polymerization reaction, and realize the attendant advantages thereto, by using this process in combination with a dimerization process in accordance with our integrated process.

Our invention therefore includes the combination, to make certain olefins, of a catalytic growth-displacement reaction and a dimerization reaction. Accordingly, it relates to the integration of a polymerization process, wherein alpha-olefins are produced using ethylene as the principal raw material, with a polymerization process wherein alpha-olefins are dimerized to form higher molecular weight products.

Some of the vital integrating aspects of our invention, which will be further detailed herein, include the dilution of a once-passed dimerization catalyst stream, from the dimerization reaction, with an alpha-olefin, or admixtures thereof, selected from $C_{22}$ to $C_{28}$. These particular alpha-olefins were heretofore generally regarded as having a higher than desired molecular weight and their production was naturally suppressed. Contrarily, in our process these alpha-olefins are essential and are employed to facilitate the recovery of the vinylidene olefins. Another important aspect of our invention is to recycle said once-passed dimerization catalyst, along with the stated alpha-olefin fraction, to the growth-displacement reaction. Other advantageous embodiments will also be more fully detailed.

The integration of the growth-displacement reaction and the dimerization reaction, as well as other embodiments thereof, will be more fully appreciated by reference to the following description and accompanying figures.

Figure 2:
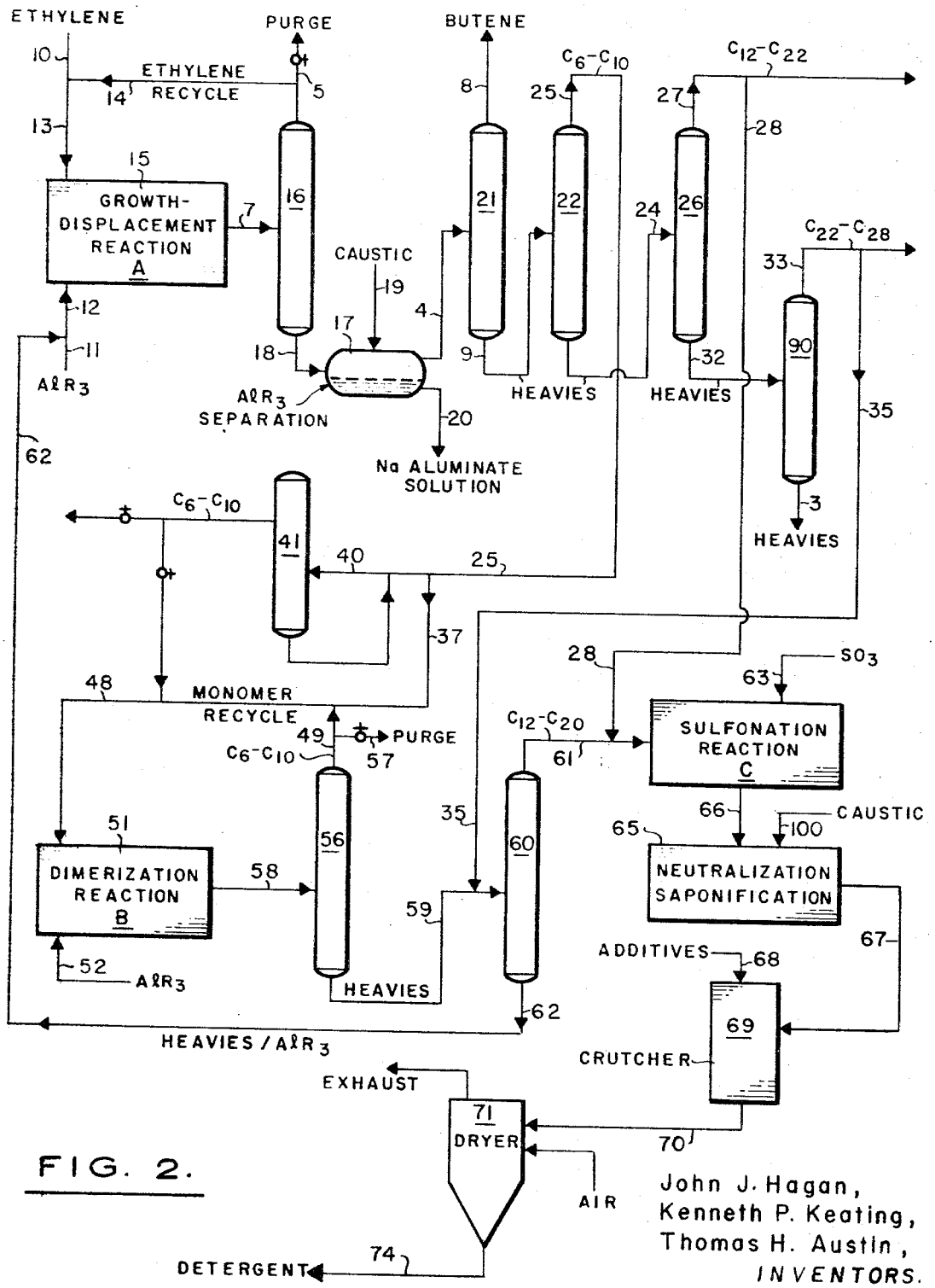

FIG. 1 represents a flow diagram in schematic form showing in a general manner the integration of the ethylene polymerization process and the dimerization process; FIG. 2 represents a flow diagram in schematic form showing in more detail a schematic representation of a plant-type installation. Representatively included in FIG. 2 is an optional feature whereby said certain olefins are used for preparing olefin sulfonate detergents.

The accompanying figures are representative only, and for the sake of simplicity various supplementary equipment, such as control devices, pumps, valves, additional fractionation equipment, and the like, have not necessarily been depicted. It should be further understood that although various reactants, products, zones, and the like, have been identified in the figures, the exact composition of the various streams, reactants, products, and the like, can be varied somewhat without departing from the spirit or the scope of our invention.

Referring to FIG. 1, it will be seen that the principal sections of our integrated process have been schematically represented. The two primary reactions have been identified as Reaction A and Reaction B. These are illustrative of the single step growth-displacement reaction and the dimerization reaction, respectively.

In general terms, ethylene and trialkylaluminum catalyst are initially fed to the combined growth-displacement reaction. The polymerization effluent stream containing the alpha-olefin product mixture and the trialkylaluminum is passed to a catalyst separation zone wherein the trialkylaluminum is deactivated and/or otherwise removed. The broad range of the mixed alpha-olefins is passed to an alpha-olefin separation zone to separate the various alpha-olefin fractions.

The lower molecular weight alpha-olefins, such as the $C_6$ to $C_{10}$'s are continuously passed as feed to the dimerization Reaction B, along with newly supplied trialkylaluminum. Optionally, a $C_{12}$ cut, or a portion thereof, such as 0 to 85 wt. percent of the $C_{12}$ cut, can also be fed to the dimerization Reaction B. Generally, essentially all of the $C_{12}$ to $C_{22}$ alpha-olefins would be recovered as principal product. The heavier alpha-olefin bottoms, i.e., the $C_{30}$ and higher molecular weight olefins, are recovered as by-products.

The $C_{24}$ to $C_{28}$ alpha-olefin fraction and, if desired, a portion or substantially all, i.e., such as about 0 to 99 wt. percent or more, of the $C_{22}$ alpha-olefin fraction is passed to the vinylidene effluent stream that is discharged from the dimerization reaction so as to dilute the concentration of said once-through trialkylaluminum catalyst stream. Said effluent stream from the dimerization reaction contains the vinylidene olefins and the trialkylaluminum and is thereby diluted by admixture with said $C_{22}$ to $C_{28}$ alpha-olefin cut.

This diluted effluent stream from the dimerization Reaction B is charged to a vinylidene separation zone wherein the vinylidene olefins, i.e., the $C_{12}$ to $C_{20}$ fraction, are recovered as product. The bottoms product resulting from this separation contains the trialkylaluminum catalyst and residue. This bottoms product is recycled to the growth-displacement reaction to provide catalyst feed for the growth-displacement reaction.

As representatively shown, the $C_{22}$ to $C_{28}$ alpha-olefin fraction that originated from the growth-displacement reaction is cycled to the dimerization effluent stream that contains the dimer and codimer (vinylidene olefins) and trialkylaluminum compounds. It is the dilution of this effluent stream with said high molecular weight alpha-olefin fraction that serves many unforeseen purposes, not the least of which is the facilitation of high molecular weight vinylidene olefin recovery.

Also representatively illustrated is another essential feature wherein the trialkylaluminum catalyst/residue from the dimerization process is recycled to the growth-displacement reaction. It should be further emphasized that a single aluminum alkyl separation zone for deactivating and removing catalysts, and a single recovery zone for removing the very high molecular weight products are depicted. In our process, these zones collectively serve both of the polymerization reactions in essential ways.

An optional feature of our invention is also represented wherein a $C_{12}$ alpha-olefin cut from the growth-displacement reaction is passed to the dimerization reaction. This optional feature provides a quantity of $C_{24}$ vinylidene olefin that can be used in similar fashion to the aforementioned recycled $C_{22}$ to $C_{28}$ alpha-olefin for facilitating the dilution of the dimerization effluent stream.

The particular sequence and manner in which the above-mentioned features are combined to provide an overall continuous process are material.

Summarily, integration of the growth-displacement reaction with the dimerization reaction, as represented, provides not only a commercially feasible integrated process for manufacturing said certain olefin materials, but surprisingly this integration can be accomplished at conversion levels, investment costs, and efficiencies, heretofore impossible.

During the work that led to our discoveries, many difficult problems were encountered and solved, before our integrated continuous process was realized. We were cognizant of the fact that our desired process would not only be a continuous one and hopefully have commercial applicability, but that it would also provide heretofore unrealized advantages over the use of the individual dimerization and ethylene polymerization reactions. Unfortunately, our discovery work was complicated by the fact that many principles applicable to the individual polymerization reactions were not entirely valid when applied to the overall process that we contemplated.

For example, it was necessary that we provide certain olefin products, as herein characterized, that contained a minimum amount of undesirable components. The presence of contaminants, such as internal olefins, paraffins, catalysts, and the like, had to be eliminated or held to such a level that the quality of the olefin material was not prejudiced.

It would naturally follow that an obvious mode of purifying or separating the desirable components from the contaminant materials and other olefin fractions not particularly suited for our purposes would be to carry out various fractional distillations, and the like.

Although some difficulties were encountered in the alpha-olefin purification and separation procedures, these were relatively minor in comparison to those discovered in connection with the recovery of the vinylidene olefins.

We realized that it was entirely impractical to separate trialkylaluminum compounds from the broad range of mixture of alpha-olefins by distillation procedures since the presence of trialkylaluminum catalysts under distillation conditions seriously degraded the alpha-olefin product, and was generally deleterious to the separation process. Separation, or inactivation, of the trialkylaluminum constituents from the alpha-olefin stream, prior to recovery of the latter, was the necessary expedient.

Our early attempts at vinylidene olefin recovery seemed to support the principle that the trialkylaluminum catalyst must also be separated from the vinylidene olefin stream prior to recovery of the latter.

In this regard, we discovered that when we attempted to recover by distillation the $C_{16}$ to $C_{20}$ vinylidene olefins the distribution of the aluminum alkyl changed as the lighter vinylidene olefins were removed. Ultimately a mixture remained that was predominantly eicosyl-aluminum trialkyl and eicosene. Recovery of the valuable eicosene product by further distillation was virtually impossible. Further, we found that the final vinylidene olefin products that were recovered were likely to have a higher than desired paraffin content. It appeared therefore that it would be necessary to remove the aluminum alkyl catalyst prior to commencing vinylidene recovery in order to prevent loss of eicosene product, redistribution of the aluminum alkyl (which also resulted in loss of valuable products) and paraffin formation.

Through our continued efforts, we later found that we could recover lower molecular weight vinylidene olefins such as those in the $C_{12}$ to $C_{14}$ range without undue difficulty as long as we did not attempt to recover, in like manner, the $C_{16}$ to $C_{20}$ vinylidene olefins. This fact, however, did not alter the aforementioned problems to any extent.

Fortunately, however, our discovery work included the finding that trialkylaluminum catalysts, in the presence of vinylidne olefins, could be subjected to higher reboiler temperatures if the concentration of the aluminum alkyls were diluted. In this regard, we found that if the effluent stream from the dimerization reaction was diluted with $C_{22}$ to $C_{28}$ higher molecular alpha-olefins, prior to any attempts at recovering the $C_{16}$ to $C_{20}$ vinylidene olefins, we could then safely separate by distillation the $C_{16}$ to $C_{20}$ fraction.

This finding was indeed fortunate because we accomplished not only the recovery of the desired vinylidene olefins by using conventional distillation at commercially feasible vacuum levels, we did so without producing undesirable levels of paraffin, without unacceptable isomerization of the vinylidene olefins, without the dimerization of the high molecular weight alpha-olefin fraction and without the expense of a catalyst separation.

Even further, the dilution of the dimerization effluent stream with the $C_{22}$ to $C_{28}$ alpha-olefin fraction caused a redistribution of the aluminum alkyls present therein and thereby freed additional eicosene product which increased the overall yield of the desired vinylidene olefins.

Since said dilution also reduced or suppressed the concentration of free aluminum hydride, the useful time the distillation equipment can be employed is prolonged since aluminum hydride is less thermally stable than the aluminum alkyls and in high concentrations can cause fouling of the recovery equipment.

Upon the separation and recovery of the desired high quality vinylidene olefins there remained the bottoms product which contained aluminum alkyl compounds, $C_{20+}$ vinylidene olefins, and $C_{22}$ to $C_{28}$ alpha-olefins, and/or admixtures thereof.

As previously mentioned, we found that these bottoms could be charged to the alpha-olefin process as a catalyst for the polymerization of ethylene. This finding was particularly important because the catalyst requirements of the alpha-olefin process exceeded that of the dimerization process and the recycle of trialkylaluminum from the dimerization reaction substantially reduces the overall catalyst cost and provides total integration of the two polymerization processes. It is of interest to note that recycling said bottoms containing the once through dimerization catalyst back through the dimerization reactor is not now recommended since this resulted in the production of very high molecular weight vinylidene olefins. Said olefins have little utility, and appeared to endanger subsequent olefin separation.

It is significant that our integrated process results in the synthesis, at high yields, of quality olefin products that have special importance. These results can now be achieved at lower material and equipment investment costs than heretofore possible. Therefore, if desired, a dimerization process can be fully integrated, according to our invention, with an already existing alpha-olefin facility and thus olefin products that are excellent material for preparing sulfonates for detergent formulations can be predominantly manufactured such as in yields of at least 60 wt. percent, and generally 70%, and higher based on ethylene, without excessive investments.

To further illustrate particular embodiments of our invention in more detail reference is again made to the schematic flow diagram depicted in FIG. 2.

The two primary reactions, e.g., the growth-displacement reaction and the dimerization reaction have been identified as Reaction A and Reaction B, respectively. An optional sulfonation facility has been depicted to show utilization of our integrated process in combination therewith. The sulfonation reaction zone has been identified as Reaction C.

Reaction A is carried out in continuous reactor 15 such as in a manner conventionally described in U.S. Pat. No. 3,482,000. Reactor 15 can be a single continuous stirred autoclave, a series thereof, a tubular reactor, or the like. Fresh ethylene is fed to reactor 15 by way of conduit 10 and recycled ethylene from line 14 by way of conduit 13. An organometallic polymerization catalyst, such as trialkylaluminum, is fed to reactor 15 through conduit 12. Fresh aluminum alkyl catalyst is fed to conduit 12 through conduit 11. Recycle aluminum alkyl catalyst is passed to conduit 12 by way of conduit 62. The catalyst can, if desired, be supplied in an inert solvent such as a saturated aliphatic hydrocarbon, i.e., hexane, n-heptane, n-dodecane, isooctane, isopentane, n-pentane, cyclohexane, cyclopentane or the like; or in aromatics, such as benzene, toluene, and the like. The amount of catalyst required will depend on several variables that are within the skill of the art to determine. Preferably, the catalyst is employed in amounts sufficient such that the aluminum utilization is sufficient to enable about 500 to about 1,000 pounds of olefin to be produced per each pound of aluminum employed.

The temperatures employed in Reaction A can vary from about 150° C. to 300° C., generally 175° C. to 240° C., and most preferably, 200° C. to 210° C. The pressure should be sufficiently high to essentially maintain the alpha-olefin product as a liquid under the reaction condition and thereby enable the catalyst and most of the ethylene to be dissolved or dispersed in said liquid. Pressures in the range of about 1,500 to 14,000 p.s.i.g., preferably 3,000 to 6,000, and most preferably about 4,000 to 5,000 p.s.i.g., are employed. The upper pressure limit is not critical but it is set by the general restriction that any pressure whatever cannot be realized.

The polymerization effluent from Reaction A comprises unreacted ethylene plus oligomers from $C_4$ to approximately $C_{40}$. The effluent products contain about 75% to 99% alpha-olefins.

The polymerization effluent leaves reactor 15 by way of conduit 7 and is charged through a pressure reducing valve, not shown, to an ethylene separation zone 16 wherein the unreacted ethylene is separated from the polymerization product and is preferably recycled to the reactor through conduit 14. Accumulation of light impurities, which are inert gases that may be produced in Reaction A or present in the fresh ethylene, can be prevented, if desired, by purging them by way of conduit 5.

The ethylene separation zone 16 can be a conventional fractional distillation apparatus. The apparatus is conventionally operated at sufficient pressure and temperature to remove substantially pure ethylene as a liquid, or it may, if desired, be operated such that ethylene is removed as a substantially pure gas. Typically, this column can be operated at about 20 to 350 p.s.i.g. bottoms pressure, and −15° C. to about +15° C. distillate temperature, and about 120° C. to 170° C. bottoms temperature.

The olefin reaction product leaves the ethylene separation zone 16 by way of conduit 18, and is charged to a catalyst separation zone 17. The polymerization effluent product is treated there in any conventional manner to deactivate the catalyst, and permit the desired product fractions to be recovered. The catalyst may be deactivated, for example, by contact with sufficient acid, base, water, or alcohol to react stoichiometrically with the catalyst. When an acid or base is employed an aqueous layer is formed which is then separated from the organic layer, and the remainder, including the solvent for the catalyst, can be separated into its component parts by distillation. If desired, the catalyst can be deactivated by contact with oxygen, and the like.

It is preferred that the aluminum alkyl be deactivated with a dilute caustic, such as a 1% to 50% sodium hydroxide aqueous solution, which is fed to zone 17 by way of conduit 19. The treatment of aluminum alkyls with dilute caustic to thereby form sodium aluminate solution and paraffin is the preferred method. A slight excess of the stoichiometric quantity of the caustic is preferably employed and, since the sodium aluminate solution lies in a metastable region, the addition of a stabilizer, such as sorbitol, is beneficial. U.S. Pat. No. 3,477,813 representatively describes a suitable method for deactivating the organometallic catalyst. The paraffins remain in the olefin phase and the sodium aluminate is contained in the aqueous phase. The aqueous sodium aluminate product is removed from zone 17 by way of conduit 20. Fortunately, the sodium aluminate solution is a useful product and can be employed in the production of paper, in the manufacture of catalyst and in water treatment facilities.

The reaction product, essentially free of aluminum compounds, leaves catalyst separation zone 17 and is charged by way of conduit 4 to a butene separation zone 21. Substantially all of the butene is removed from the reaction product in butene separation zone 21. The butene removal can be accomplished by conventional fraction distillation apparatus. Preferably, the butene fractionation equipment is operated under conditions whereby substantially pure liquid butene is removed as a distillate product by way of conduit 8. Although not shown, the n-butene, or a portion thereof, can be recycled to the catalytic polymerization Reaction A. Recycle of the n-butene will, of course, increase the amount of vinylidene olefins produced.

Alpha-olefin product, essentially free of butene, is discharged from butene separation zone 21 and charged to light olefin recovery zone 22 through conduit 9. In the light olefin recovery zone 22, essentially all of the hexene-1, octene-1 and decene-1 (and optionally all or a portion of dodecene-1) are separated as a mixed stream from the remaining alpha-olefin reaction product. This option has not been schematically depicted but the dodecene-1 can likewise be passed via conduit 25 for further processing. This light olefin fraction is discharged and passed by way of conduit 25 for further processing according to our invention. Typically, this zone can be a fractional distillation column and it can be operated at conventional conditions.

The remaining alpha-olefin product will generally comprise the $C_{12}$ and higher olefins. This fraction is charged to the intermediate olefin recovery zone 26 through conduit 24. In the intermediate olefin recovery zone essentially all of the dodecene-1 through eicosene-1 are removed by way of conduit 27. This alpha-olefin fraction represents preferred olefin material that is particularly suitable for sulfonation and detergent preparation. The separation in intermediate olefin recovery zone 26 is carried out at conventional conditions. Generally, this column is merely operated at conditions such that a portion of the doeicosene is removed as an intermediate olefin and a portion is retained as a bottoms product.

The intermediate olefin fraction can be used as a blended mixture and passed as such through conduit 28 if the products are to be sulfonated or, if desired, they can be charged to a purification zone (not shown) for separation into pure carbon number fractions which fractions or portions thereof passed by way of conduit 28 for detergent preparation when desired.

The heavier alpha-olefin product is discharged from the intermediate recovery zone 26 and charged to the heavy olefin recovery zone 90 by way of conduit 32. In the heavy olefin recovery zone 90 a tetracosene-1 to octacosene-1 fraction, usually including a portion of the doeicosene, is removed via conduit 33. The distillate fraction is recovered and charged for further processing by way of conduit 35. If desired, excess material can be passed to a product storage facility not shown for holding until it is needed.

Heavy waxes, i.e., $C_{30}$ and higher olefins, are removed from the heavy olefin recovery zone 90 by way of conduit 3.

The second major portion of our integrated process is representatively depicted as dimerization Reaction B. The dimerization reactor 51 receives hexene-1, octene-1, or decene-1, and admixtures thereof, from the alpha-olefin process through conduit 25. This light olefin stream can be fed directly to the dimerization reactor 51 by way of conduit 37 or it can be charged by way of conduit 40 to feed preparation zone 41 wherein various pure fractions or blends can be prepared as olefin feed or separated and sent to storage and/or otherwise employed. Typically, a majority of the $C_6$ to $C_{10}$ alpha-olefins will be fed to Reaction B.

Fresh monomer feed from conduit 48 is admixed with recycle monomer provided by way of conduit 49, and they are charged to the reactor 51 by way of conduit 48.

Aluminum alkyl catalyst is charged to dimerization reactor 51 by way of conduit 52. Dimerization reactor 51 can be operated under conventional conditions. Preferably, pressure sufficient to maintain the reactants essentially in the liquid phase is employed. The upper pressure limitation is limited only by those pressures that are economically feasible, preferably, pressures in the range of about 600 to 3,000 p.s.i.g. are employed. Temperatures in the range of about 140° C. to 300° C., generaly about 200° C. to 230° C., and most preferably about 180° C. to 250° C., are employed. Generally, about 30 to about 2,500 mols of olefin per mol of aluminum alkyl catalyst is employed, preferably, about 400 to 2,000, and most preferably, about 1,000 to 1,500 mols of olefin per mol of aluminum alkyl.

The dimerization effluent is discharged from dimerization reaction zone 51 and is passed to a monomer recovery zone 56 through conduit 58. Monomer recovery zone 56 is a continuous fractional distillation column operating at about atmospheric pressure or subatmospheric pressure. An essentially monomer-free bottoms stream is discharged therefrom via conduit 59. This stream comprises the dimerized light olefin product and aluminum alkyls. The distillate fraction from the monomer recovery zone 56 comprises unreacted alpha-olefin monomer, isomerized monomer, small amounts of low molecular weight codimer olefins that were formed when short carbon chains on the aluminum alkyl catalyst reacted with the monomer feed, and impurities such as paraffins, internal olefins, and the like, which were present in the fresh monomer feed. Some of the distillate stream is preferably purged by way of conduit 57 to prevent the build up of inert material. The remaining distillate is recycled to Reaction B by way of conduit 19.

The bottoms product from the monomer recovery zone 56 containing the dimerization products are admixed with the $C_{22}$ to $C_{28}$ alpha-olefin mixtures passed by way of conduit 35. The dilution of this discharged effluent stream 59 can, as before stated, be diluted by admixing thereto $C_{24}$ vinylidene olefin which supplements the $C_{22}$ to $C_{28}$ alpha-olefins. According to this option dodecene-1 from the alpha-olefin section is charged by way of conduit 37 to the dimerization Reaction B and is discharged in the bottoms product in monomer recovery zone 56. Although dilution of the polymerization reaction product stream discharged through conduit 59 with an alpha-olefin selected from $C_{22}$ to $C_{28}$, or admixtures thereof, is representatively depicted as being diluted prior to charging said stream to the vinylidene recovery zone 60, it is within the scope of this invention to charge said alpha-olefin within the range of $C_{22}$ to $C_{28}$ at any time prior to the removal of the $C_{16}$ and higher vinylidene olefins.

Sufficient $C_{22}$ to $C_{28}$ alpha-olefins should be charged by way of conduit 35 to provide from about .5 to 25%, preferably about 1% to 10%, by weight of the vinylidene olefins charged by way of conduit 99 to vinylidene recovery zone 60.

Typically, zone 60 is a vacuum fractional distillation column operated at about 5 mm. to 15 mm. mercury total pressure so as to enable removal of the distillate product which comprises the $C_{12}$ to $C_{20}$ vinylidene olefin product. The bottoms from vinylidene recovery zone 60 is discharged through conduit 62 and passed to Reaction A through conduit 12.

As hereinbefore described, our integrated process produces, from ethylene and aluminum alkyls, valuable products which can be used as feedstocks for the production of biodegradable detergents. Accordingly, we have shown the optional combination of our integrated process with a sulfonation reaction, i.e., zone C. Therefore, all or a portion of the $C_{12}$ to $C_{22}$ alpha-olefin product recovered by way of conduit 27 and all or a portion of the $C_{12}$ to $C_{20}$ vinylidene olefin product, can be separately sulfonated, or cosulfonated, by passing a mixture of these two products by way of conduit 62 to a sulfonation reaction zone 64 along with sulfur trioxide by way of conduit 63. Zone 64 is preferably a falling-film reactor, such as typically described in U.S. Pat. No. 3,501,267. It can be operated according to conventional procedures. The sulfonated olefin product is discharged from Reaction 64 by way of conduit 66 and charged to neutralization and saponification zone 65, along with caustic soda by way of line 100, to neutralize and to form the sodium salt of the olefin sulfonates. The sulfonated products can be discharged by way of conduit 67 to crutcher 69 wherein conventional additives can be employed to formulate a commercial detergent which can be admixed therewith in slurry form. The resulting slurry is discharged through conduit 70 to a conventional spray dryer 71. The slurry is spray dryed and passed by way of conduit 74 for storage, packaging, or the like.

It should be noted that there are many other end uses for the particular olefin products produced according to this integrated process. They find utility as solvents, as starting materials for the preparation of normal alcohols, polymers, copolymers, and the like. Accordingly, the alpha-olefin fraction and the vinylidene olefin fraction can, if desired, be individually utilized according to the requirements of the producer.

Therefore, in accordance with this invention, essential features of which have been described above, a growth displacement reaction is integrated in combination with a dimerization reaction in a particular fashion for the manufacture of olefins predominantly comprising normal alpha-olefins having about 12 to 22 carbon atoms per molecule and vinylidene olefins having about 1 to 20 carbon atoms per molecule, wherein the latter can be characterized by the following representative formula:

wherein $R_1$ and $R_2$, taken individually, each represents a $C_4$ to $C_{10}$ alkyl, and wherein the total carbon atoms per molecule are in the preferred range of about 12 to 20 carbon atoms.

The growth-displacement reaction includes the steps of polymerizing ethylene at elevated temperature and pressure under the influence of catalytic amounts of trialkylaluminum to form a polymerization effluent containing mixtures of alpha-olefins and trialkylaluminum catalysts. The trialkylaluminum catalyst is then separated from the polymerization effluent stream and the alpha-olefin mixture is separated to form the following: (a) a lower molecular weight alpha-olefin fraction containing alpha-olefins in the range of about $C_6$ to $C_{10}$, and admixtures thereof, and optionally, $C_{12}$ ad admixtures thereof, (b) a second intermediate alpha-olefin fraction containing alpha-olefins in the range of about $C_{12}$ to $C_{22}$ and admixtures thereof, and (c) a third alpha-olefin fraction containing alpha-olefins in the range of about $C_{22}$-$C_{28}$ and admixtures thereof; wherein said $C_{12}$ to $C_{22}$ fraction is collected as valuable product; and wherein said $C_6$ to $C_{10}$ alpha-olefin fraction is employed as monomer feed in a dimerization reaction section as hereinafter described.

The dimerization section includes the steps of dimerizing at elevated temperatures and pressures under the influence of trialkylaluminum an olefin feed comprising $C_6$ to $C_{10}$ alpha-olefins supplied from said growth-displacement section to produce a vinylidene polymerization effluent stream containing trialkylaluminum, and mixtures of vinylidene olefins. It should be noted that when the expression "dimerization" is used herein and in the claims such term includes the formation of vinylidene olefins wherein two unlike unsaturated hydrocarbon molecules, i.e., codimer, as well as the formation of two like molecules of unsaturated hydrocarbon, i.e., dimers, are prepared. A $C_{22}$ to $C_{28}$ alpha-olefin fraction supplied from said growth-displacement section is admixed with said vinylidene polymerization effluent stream and the mixture is passed to a vinylidene olefin separation zone wherein vinylidene olefins in the range of about $C_{12}$ to $C_{20}$ are recovered as product. The bottoms product from the vinylidene olefin product separation contains the trialkylaluminum residue, higher molecular weight vinylidene olefins, $C_{22}$ to $C_{28}$ alpha-olefins or combinations and admixtures thereof, and it is recirculated to said growth-displacement reaction to provide active trialkylaluminum catalyst for said growth-displacement reaction.

To further illustrate the foregoing discussion and description the following working example is presented; which example illustrates operation of our integrated process. The following example is not to be interpreted as a limitation on the materials or conditions therein employed nor does it otherwise limit the scope of our invention.

EXAMPLE

Fresh ethylene and ethylene recycle feed were passed by way of conduit 13 to a growth-displacement Reaction A, as illustrated in FIG. 2. The growth-displacement reactor 15 was a tubular reactor operated at 4,500 p.s.i.g. at a temperature of 200° C. The yield of $C_{12}$ to $C_{20}$ alpha-olefins was about 38%, the yield of $C_6$ to $C_{10}$ alpha-olefins was about 38%, and the aluminum utilization represented about 800 to 1,000 pounds of alpha-olefin for each pound of aluminum employed. The remaining reaction product comprised unreacted ethylene plus oligomers from $C_{22}$ to $C_{40}$ as well as butenes. The reaction product also contained small amounts of internal vinylidene olefins.

The growth-displacement reaction product was passed to an ethylene separation zone 16, and the unreacted ethylene removed and recycled to the growth-displacement reactor 15. The ethylene separation zone was operated at 280 p.s.i.g. bottoms pressure, 135° C. bottom temperature and a −1.1° C. distillate temperature.

The bottoms product was discharged from the ethylene separation zone by way of conduit 18 and charged to a catalyst separation zone 17 wherein a 10% sodium hydroxide aqueous solution was admixed therewith. The aluminum alkyls present therein reacted with the dilute caustic to form sodium aluminate solution and paraffin. The paraffins remained in the olefin phase while the sodium aluminate was extracted into the aqueous phase. The aqueous phase was removed and the sodium aluminate solution recovered.

The alpha-olefin fraction, substantially free of aluminum compounds, was removed from zone 17 and passed to a butene separation zone 21. The butene was removed by a fractional distillation apparatus operated at a tower pressure of 52 p.s.i.g., at a tower temperature at the top of 44° C., and at a bottom tower temperature of 186° C. An alpha-olefin product, substantially free of butene-1, was discharged from the butene separation zone and passed to a light olefin recovery zone. The light olefin recovery zone 22 separates essentially all the hexene-1 through decene-1 alpha-olefins as a mixed stream. The light alpha-olefin recovery zone was a fractional distillation column operated at atmospheric pressure with a top temperature of 146° C. and a bottom temperature of 263° C. About 99.8% of the hexene, octene and decene mixture, containing less than 2% other carbon numbered products was obtained.

The remaining alpha-olefin product bottoms was discharged from the light olefin recovery zone and charged into the intermediate olefin recovery zone 26. The alpha-olefin fraction comprising essentially all of the $C_{12}$ to $C_{20}$, plus about 50 wt. percent of the $C_{22}$, was removed by way of line 27.

Intermediate olefin recovery zone 26 was a vacuum fraction distillation column operated at a pressure of about 10 mm. mercury absolute, at a top temperature of about 120° C., and at a bottom temperature of about 244° C. About 90% recovery of the $C_{12}$ to $C_{22}$ olefins was obtained. This intermediate olefin fraction was passed via conduit 28 and transferred by conduit 62 for sulfonation in Reaction C.

Th heavy alpha-olefin products discharged from intermediate recovery zone 26 were charged to a heavy olefin recovery zone 90 wherein the $C_{22}$ to $C_{28}$ alpha-olefins were separated from the residual and heavy alpha-olefins, e.g., $C_{30+}$, by vacuum evaporation. The $C_{22}$ to $C_{28}$ fraction was removed at a temperature of about 200° C. to 241° C. at .5 mm. mercury total pressure. The $C_{22}$ to $C_{28}$ alpha-olefin fraction was passed through line 35 to transfer line 99 for charging to vinylidene olefin separation zone 60.

The $C_6$ to $C_{10}$ light alpha-olefin fraction that was separated in said zone 22 is passed to a dimerization reactor 51 through conduit 50 with trialkylaluminum via conduit 52. Dimerization reactor 51 was operated at a pressure of 2,500 p.s.i.g. at a temperature of 200° C. to 220° C. The olefin to trialkylaluminum mol ratio was about 1000:1. Fresh monomer feed was also mixed with the recycle monomer from the monomer separation zone 56 via conduit 49. The dimerization reaction product discharged from zone 51 was passed to monomer recovery zone 56 wherein a continuous fractional distillation column was employed. The monomer was recovered as the distillate fraction and the bottoms product discharged and admixed with said $C_{22}$ to $C_{28}$ alpha-olefin mixture from the alpha-olefin section. This final mixture, passed by conduit 99, contained 5 wt. percent $C_{22}$ to $C_{28}$ alpha-olefins by weight of the entire mixture.

This mixture was charged to vinylidene recovery zone 60 wherein the vinylidene olefin products were separated. The vinylidene separation zone was a vacuum fractional distillation column operated at 25 mm. mercury total pressure. The distillate product boiled in the range of about 140° C. to 190° C. and comprised the $C_{12}$ to $C_{20}$ vinylidene olefins which were recovered as product. The bottoms residue from the vinylidene recovery zone 60 was removed and passed to the growth-displacement Reaction A.

The $C_{12}$ to $C_{20}$ vinylidene olefin was admixed with the alpha-olefin product, i.e., the $C_{12}$ to $C_{22}$, and the blend was fed by way of conduit 62 to a falling-film sulfonation reactor 64, along with sulfur trioxide.

The olefin feed comprised about 13.1% $C_{12}$ vinylidene olefin, 14.8% $C_{16}$ alpha-olefin, 14 wt. percent $C_{16}$ vinylidene olefin, 11.87 $C_{18}$ alpha-olefin, and 3.8% $C_{18}$ vinylidene olefin, 9.4% $C_{20}$ alpha-olefin, 7.6 wt. percent $C_{20}$ vinylidene olefin and 5.5% $C_{22}$ alpha-olefin. The falling-film reactor was operated at atmospheric pressure at a temperature of about 20° C., with a sulfur trioxide to olefin mol ratio of about 1:15. The sulfur trioxide was diluted with inert gas to provide about a 5 volume percent of sulfur trioxide. The neutralized and saponified olefin sulfonates were recovered.

As will be evident to those skilled in the art, various modifications of the description of this invention can be made or followed in light of the discussion and disclosure herein set forth without departing from the spirit or the scope thereof.

What is claimed is:

1. An integrated continuous process for the manufacture of alpha-olefins having predominantly about 12 to 22 carbon atoms per molecule and vinylidene olefins having predominantly about 12 to 20 carbon atoms per molecule comprising, in combination, a growth-displacement reaction section and a dimerization reaction section, both of said sections as herein defined and integrated:

(1) the said growth-displacement reaction section including the steps of catalytically polymerizing ethylene with an effective amount of trialkylaluminum catalyst at elevated temperatures and pressures forming thereby a polymerization effluent comprising trialkylaluminum catalyst and an alpha-olefin mixture, then separating from said polymerization effluent said organometallic catalyst to form an alpha-olefin mixture essentially free of catalyst, then separating said alpha-olefin mixture into a lower molecular weight alpha-olefin fraction containing alpha-olefins in the range of about $C_6$ to $C_{12}$, and admixtures thereof, a second intermediate alpha-olefin fraction containing alpha-olefins in the range of about $C_{12}$ to $C_{22}$, and admixtures thereof, and a third alpha-olefin fraction containing alpha-olefins in the range of about $C_{22}$ to $C_{28}$, and admixtures thereof, wherein said lower molecular weight alpha-olefin fraction and said third alpha-olefin fraction are employed in the dimerization reaction section as hereinafter described; and (2) the said dimerization reaction section including the steps of dimerizing with an effective amount of trialkylaluminum catalyst at elevated temperatures and pressures an olefin feed comprising said lower molecular weight alpha-olefin fraction from (1) forming thereby a vinylidene polymerization effluent containing trialkylaluminum catalyst and mixtures of vinylidene olefins, then diluting the vinylidene polymerization effluent stream by admixing thereto said third alpha-olefin fraction from (1), then separating from the diluted vinylidene polymerization effluent stream a vinylidene olefin fraction containing vinylidene olefins in the range of about $C_{12}$ to $C_{20}$, and admixtures thereof, and recirculating the remaining bottom fraction of the vinylidene polymerization effluent stream containing the organometallic catalyst to said growth-displacement reaction (1) and employing said trialkylaluminum catalyst in said growth-displacement reaction (1).

2. The process according to claim 1 wherein said lower molecular weight alpha-olefin fraction consists essentially of alpha-olefins in the range of about $C_6$ to $_{10}$, and wherein said third alpha-olefin fraction which is employed to dilute said vinylidene polymerization effluent stream is employed in amounts sufficient to provide about .5 to 25 wt. percent thereof based on the weight of said vinylidene polymerization effluent stream.

3. An integrated continuous process for the manufacture of alpha-olefins having predominantly about 12 to 22 carbon atoms per molecule and vinylidene olefins having predominantly about 12 to 20 carbon atoms per molecule comprising, in combination, a growth-displacement reaction section and a dimerization reaction section, both of said sections as herein defined and integrated:

(1) the said growth-displacement reaction section including the steps of polymerizing ethylene in the presence of a trialkylaluminum catalyst at a temperature in the range of about 150° C. to 300° C. at a pressure within the range of about 3,000 to 6,000 p.s.i.g. and forming thereby a polymerization effluent comprising trialkylaluminum catalyst and an alpha-olefin mixture, then separating from said polymerization effluent said trialkylaluminum catalyst forming thereby an alpha-olefin mixture essentially free of trialkylaluminum catalyst, then separating said alpha-olefin mixture into a lower molecular weight alpha-olefin fraction containing alpha-olefins in the range of about $C_6$ to $C_{12}$, and admixtures thereof, a second intermediate alpha-olefin fraction containing alpha-olefins in the range of about $C_{12}$ to $C_{22}$, and admixtures thereof, and a third alpha-olefin fraction containing alpha-olefins in the range of about $C_{22}$ to $C_{28}$, and admixtures thereof, wherein said lower molecular weight alpha-olefin fraction and said third alpha-olefin fraction are employed in the dimerization reaction section as hereinafter described; and (2) the said dimerization reaction section including the steps of dimerizing at a pressure in the range of about 600 to 3,000 p.s.i.g. at a temperature in the range of about 140° C. to 300° C., said lower molecular weight alpha-olefin fraction from (1) under the influence of trialkylaluminum catalyst to form thereby a vinylidene polymerization effluent containing trialkylaluminum and mixtures of vinylidene olefins, then diluting said vinylidene polymerization effluent stream by admixing thereto said third alpha-olefin fraction from (1), then separating from the diluted vinylidene polymerization effluent stream a vinylidene olefin fraction containing vinylidene olefins in the range of about $C_{12}$ to $C_{20}$, and admixtures thereof, and recirculating the remaining effluent stream containing the trialkylaluminum catalyst to said growth-displacement reaction (1) and employing the trialkylaluminum catalyst in said growth-displacement reaction.

4. The process according to claim 3 wherein said lower molecular weight alpha-olefin fraction consists essentially of alpha-olefins in the range of about $C_6$ to $C_{10}$, and wherein said third alpha-olefin fraction which is employed to dilute said vinylidene polymerization effluent stream is employed in amounts sufficient to provide about .5 to 25 wt. percent thereof based on the weight of said vinylidene polymerization effluent stream.

References Cited
UNITED STATES PATENTS

| | | | |
|---|---|---|---|
| 2,695,327 | 11/1954 | Ziegler et al. | 260—683.15 D |
| 2,889,314 | 6/1959 | Fritz | 260—683.15 D |
| 3,310,600 | 3/1967 | Ziegler et al. | 260—683.15 D |
| 3,482,000 | 12/1969 | Fernald et al. | 260—683.15 D |
| 3,492,364 | 1/1970 | Jones et al. | 260—683.15 D |

DELBERT E. GANTZ, Primary Examiner

J. W. HELLWEGE, Assistant Examiner

UNITED STATES PATENT OFFICE
CERTIFICATE OF CORRECTION

Patent No. 3,751,518                    Dated August 7, 1973

John Joseph Hagan, Kenneth Patrick Keating,
    and Thomas Howard Austin
Assignors to Jefferson Chemical Company, Inc.
    Houston, Texas, a corporation of Delaware It is certified that errors appear in the above-identified patent and that said Letters Patent are hereby corrected as shown below:

In the drawings, Figure 1 appears twice. Figure 2 has been omitted. Column 1, line 61, "util" should read -- until --. Column 4, line 23, following "alpha-olefin" should read -- fraction --. Column 5, line 27, "vinylidne" should read -- vinylidene --. Column 6, line 75, "20" should read -- 200 --. Column 7, line 45, "n-butene" should read -- n-butenes --. Column 8, line 68, "19" should read -- 49 --. Column 9, line 64, "1" should read -- 12 --. Column 10, line 11, "ad" should read -- and --. Column 11, line 36, "Th" should read -- The --. Column 12, line 5, "11.87" should read -- 11.8% --. Column 14, line 9, after "remaining" should read -- bottom fraction of the vinylidene polymerization --.

Signed and sealed this 18th day of December 1973.

(SEAL)
Attest:

EDWARD M. FLETCHER, JR.              RENE D. TEGTMEYER
Attesting Officer                     Acting Commissioner of Patents